US012693928B2

(12) United States Patent
Parthasarathy et al.

(10) Patent No.: US 12,693,928 B2
(45) Date of Patent: Jul. 28, 2026

(54) AUTOMATED HELP DESK

(71) Applicant: Omnissa, LLC, Mountain View, CA (US)

(72) Inventors: Kannan Parthasarathy, Palo Alto, CA (US); Arijit Pathak, Karnataka (IN); Hayden Davis, Denver, CO (US)

(73) Assignee: Omnissa, LLC, Mountain View, CA (US)

( * ) Notice: Subject to any disclaimer, the term of this patent is extended or adjusted under 35 U.S.C. 154(b) by 181 days.

(21) Appl. No.: 18/476,847

(22) Filed: Sep. 28, 2023

(65) Prior Publication Data

US 2025/0110822 A1     Apr. 3, 2025

(51) Int. Cl.
| | |
|---|---|
| *G06F 11/00* | (2006.01) |
| *G06F 11/07* | (2006.01) |
| *G06F 16/334* | (2025.01) |

(52) U.S. Cl.
CPC ...... *G06F 11/0793* (2013.01); *G06F 11/0766* (2013.01); *G06F 16/3344* (2019.01)

(58) Field of Classification Search
CPC ............. G06F 11/0793; G06F 11/0766; G06F 11/0787; G06F 11/0769; G06F 11/0775
See application file for complete search history.

(56) References Cited

U.S. PATENT DOCUMENTS

2018/0173584 A1* 6/2018 Eckstein ............. G06F 11/0775

FOREIGN PATENT DOCUMENTS

WO     WO-2025048864 A1 * 3/2025 .......... G06F 11/0727

* cited by examiner

*Primary Examiner* — Katherine Lin
(74) *Attorney, Agent, or Firm* — Kim & Stewart LLP

(57) ABSTRACT

Disclosed are various embodiments for automating IT help desk services by utilizing historical IT help desk data to identify potential solutions for incidents. First, a ticket associated with an incident on a client device can be received. Next, a ticket record can be generated by extracting information from the ticket using natural language processing techniques. Next, using the ticket record as a key, a graph database can be queried for one or more similar ticket records. In response to obtaining similar ticket records from the graph database, the graph database can be further queried for solution records related to the similar ticket records by edges. The solution can comprise a set of machine-readable instructions which can resolve the incident when executed.

20 Claims, 6 Drawing Sheets

AUTOMATED HELP DESK

BACKGROUND

An Information Technology (IT) Help Desk is a software platform which is designed to help an enterprise provide technical support for its employees. An employee, or in some cases, a customer, who is experiencing an issue can submit a request for help in the form of an IT service ticket. The IT Help Desk can coordinate with support professionals to assist the user in resolving the issue.

With the increasing number of enterprise employees working remotely, there has been a considerable increase in the number of IT service tickets raised by the employees. Often, the issues encountered are common for a group of IT service tickets and the solution implemented to rectify them is also similar across all the affected devices. However, each time a new IT service ticket is raised, the assigned support professional must repeat the task of investigating the root cause of the issue.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
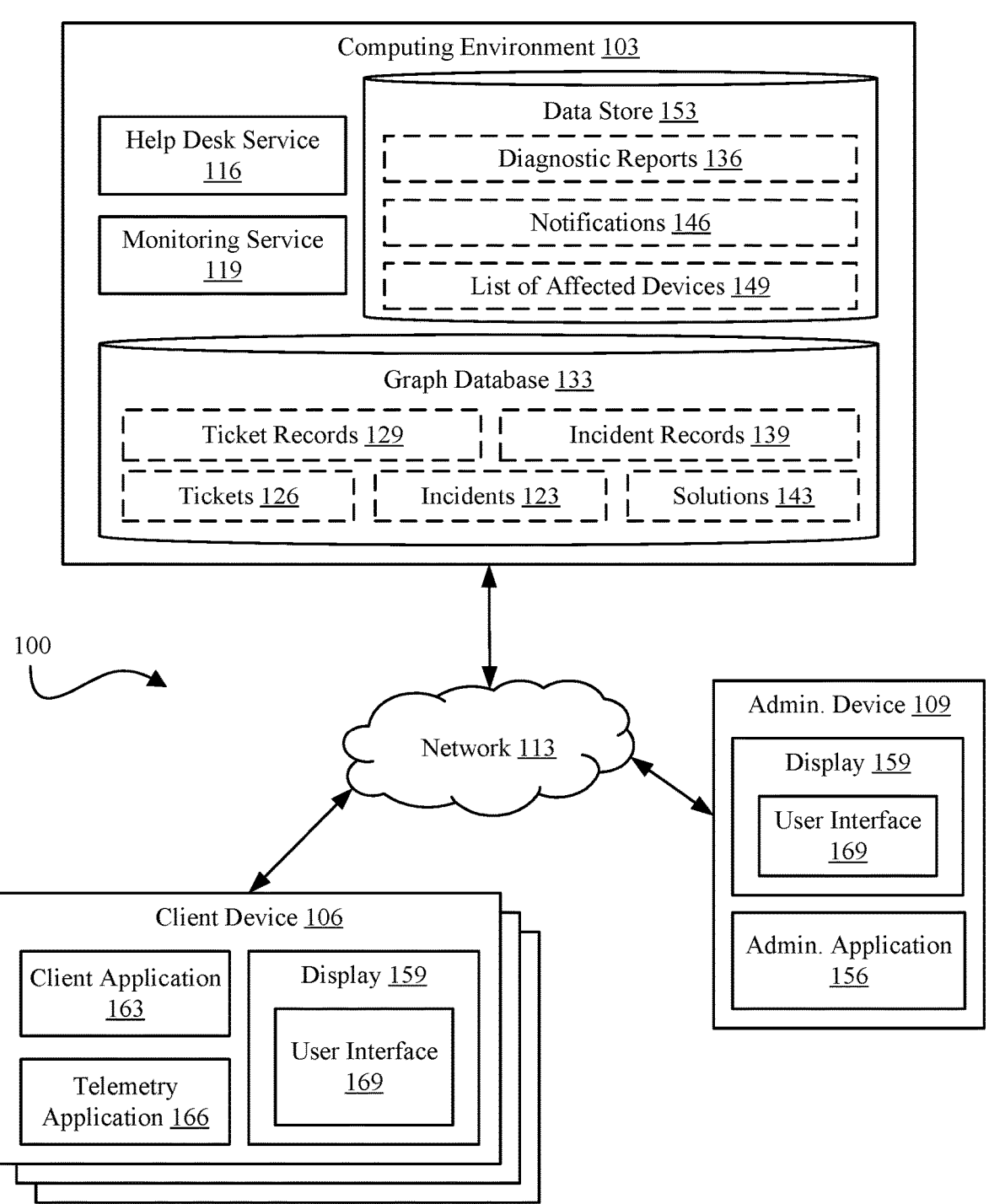
FIG. 1 is a drawing of a network environment according to various embodiments of the present disclosure.

Disclosed are various approaches for automating IT help desk services by utilizing historical IT help desk data to identify potential solutions for incidents. Often, IT issues experienced by users (employees, customers, etc.) of an enterprise are shared by multiple other users. In addition, many users do not submit IT service tickets despite experiencing the same or similar issues.

For example, users often tend to ignore the visible tell-tale signs of device fatigue and issues which, when neglected, can lead to fatal system crashes in the future. It is only when users experience recurrent device crashes or issues that they cannot correct by themselves that users raise IT service tickets for help. If the user had reached out to the IT Help Desk before trying to rectify the device problem on their own, it is likely that an IT support professional could have resolved the issue faster with minimal or perhaps no impact on the device downtime. Ignoring the initial tell-tale signs of device issues often leads to extended device downtime and potential loss of data. The problem can be further compounded by the fact that in some cases the device may no longer be able to connect to the enterprise network or it may not start at all. In such scenarios, there is no other option, but the affected device must be checked manually by the IT support professional. Even if the solution to resolve the issue is simple and its implementation is quick, the time spent by the support professional investigating the root cause of the problem makes the entire process considerably time consuming. In this present world, where many employees are working remotely, such scenarios may lead to undesirable delays and loss in productivity.

It is often beneficial to detect and rectify initial device issues, however small they may be, as early as possible. However, end users are unlikely to raise an IT service ticket for every device issue or crash that they experience, especially given that a majority of device issues can be rectified by a simple device restart-though overlooking and perhaps neglecting the underlying cause of the problem. In addition, the remote working environment of employees across many organizations has exacerbated these already difficult IT issues. Not only do the IT departments have to manage a large volume of tickets on a regular basis but often, because of initial neglect and lack of knowledge on the part of a user, the IT support professionals must address those tricky scenarios where an employee's device may either not restart or may not connect to the enterprise network.

As such, various embodiments of the present disclosure are directed to automating portions of an IT Help Desk service by use of Natural Language Processing (NLP), similarity detection algorithms and other machine learning tools. The systems and methods described herein can automatically detect similar service tickets-both current and from the past-through text analysis of the individual tickets combined with the execution of a similarity detection algorithm on underlying device telemetry data. This system can not only detect similar tickets from the past and locate other devices with similar issues, but also propose a possible solution to rectify the same. This system can aid in decreasing the overall volume of tickets received by an IT Help Desk and can help considerably reduce the resolution time of individual tickets. Using similarity detection algorithms, this system can also detect devices which are vulnerable to potential issues in the future and can proactively help in preventing these scenarios by proposing appropriate interventions. Proactively preventing device issues not only helps in reducing the number of service tickets but also helps in avoiding the tricky situations mentioned earlier—thereby ensuring a consistent user experience. Additionally, this system can be supported by an underlying graph database which helps in searching for a solution in real time.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

With reference to FIG. 1, shown is a network environment 100 according to various embodiments. The network environment 100 can include a computing environment 103, one or more client devices 106, and one or more administrative devices 109 which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dialup, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a help desk service 116, a monitoring service 119, and other applications, services, processes, systems, engines, or functionality not discussed in detail herein.

The help desk service 116 can receive and manage service tickets to resolve incidents 123. In some examples, as described further in the descriptions of FIGS. 2, 6, and 7, the help desk service 116 can be executed to receive a ticket 126 and generate a ticket record 129 to be stored in a graph database 133. Next, the help desk service 116 can be executed to receive diagnostic reports 136 and generate incident records 139 to be stored in the graph database 133. Next, the help desk service 116 can search the various records in the graph database 133 to identify a solution 143 which was used to resolve a similar incident 123. Additionally, according to various examples, the help desk service 116 can send notifications 146 to client devices 106 or administrative devices 109. Finally, the help desk service 116 can push the solution 143 to affected devices. The execution of the help desk service 116 is further described in the description of FIGS. 2, 6, and 7.

Figures 3, 4:
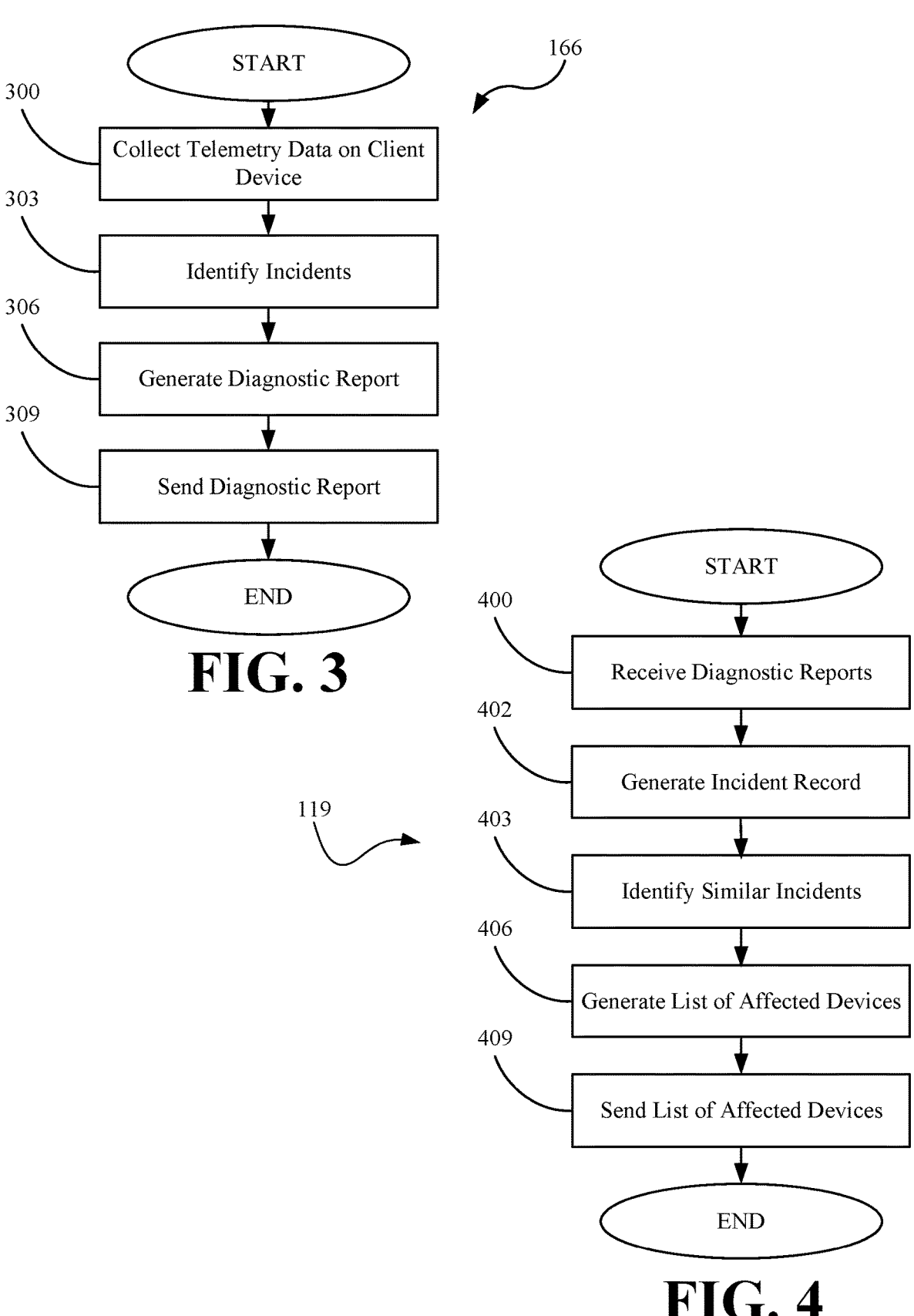
FIG. 3 is a flowchart illustrating one example of functionality implemented as portions of an application executed in a computing environment in the network environment of FIG. 1 according to various embodiments of the present disclosure.
FIG. 4 is a flowchart illustrating one example of functionality implemented as portions of an application executed in a computing environment in the network environment of FIG. 1 according to various embodiments of the present disclosure.

The monitoring service 119, described in greater detail in the description of FIG. 4, can be executed to collect telemetric data from one or more client devices 106 in the network environment 100. In some examples, the monitoring service 119 uses the telemetric data to identify incidents 123. The monitoring service 119 can be executed to generate a list of affected devices 149 to send to the help desk service 116. The execution of the monitoring service 119 is further described in the description of FIG. 4.

Also, various data are stored in a data store 153 that is accessible to the computing environment 103. The data store 153 can be representative of a plurality of data stores 153, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the computing environment data store 153 is associated with the operation of the various applications or functional entities described below. This data can include diagnostic reports 136, notifications 146, lists of affected devices 149, and potentially other data.

Diagnostic reports 136 can represent telemetric data associated with a particular client device 106. According to various embodiments, the diagnostic report 136 includes telemetric data from a client device 106 corresponding in time to an incident 123. In some embodiments, the diagnostic report 136 can be a snapshot of a client device 106, a system report, or other form of telemetric data about the state of the client device 106. In some examples, the diagnostic report 136 can include data about the hardware, software, operating system, configuration settings, memory, disk utilization, updates, user interactions, system performance, security information, application crashes, etc.

Notifications 146 can represent an alert, an indicator, a message, or other notice. In some examples, the notifications 146 include a troubleshoot notification which can be sent to an administrative application 156 to prompt an administrative agent to begin a troubleshooting procedure. In some embodiments, the notifications 146 include a "solution found" notification which can be sent to the administrative application 156 to prompt an administrative agent to implement the solution 143. Notifications 146 can also be sent to client devices 106 to alert users that a solution 146 has been found, or to another system, device, or application.

Lists of affected devices 149 can represent a number of client device 106 which are experiencing issues. For example, a list of affected devices 149 can identify each of a plurality of client devices 106 which have experienced similar incidents 123. In some examples, a list of affected devices 149 can identify each of a plurality of client devices 106 which have experienced any incidents 123 within a given timeframe. In some embodiments, there can be multiple lists of affected devices 149, where the lists are grouped together according to incidents 123, type of client device 106, timeframe, whether or not a corresponding ticket 126 exists for an incident 123 occurring on a client device 106, or according to some other parameter. The lists of affected devices 149 can be generated by the monitoring service 119.

Additionally, various data can be stored in a graph database 133 that is accessible to the computing environment 103. The graph database 133 can be hosted by one or more data storage applications or data structures. Moreover, combinations of these databases, data storage applications, and/ or data structures can be used together to provide a single, logical, graph database 133. The data stored in the graph database 133 can be stored in the form of nodes (e.g., entities) and edges (e.g., relationships between the nodes). The data stored in the computing environment graph database 133 is associated with the operation of the various applications or functional entities described herein. This data can include incidents 123, incident records 139, tickets 126, ticket records 129, solutions 143, and potentially other data.

Incidents 123 can be stored as nodes which represent an issue, error, crash, disruption, or other event which impacts the operation or quality of a service. Incidents 123 can represent identifying information about the event such as the client device 106 which experienced the event, the time at which the event occurred, or other identifying information. In some examples, incidents 123 can be vector representations of the identifying information about an event. Incidents 123 can be related to incident records 139, tickets 126, ticket records 129, solutions 143, and/or potentially other nodes by one or more edges in the graph database 133.

Incident records 139 can be stored as nodes which represent the specific details and context of an incident 123. Incident records 139 can represent the diagnostic report 136 associated with an incident 123, telemetric data from the client device 106, or other contextualizing information. In some embodiments, incident records 139 are vector representations of the context associated with an incident 123. In some embodiments, an incident record 139 can be shared by more than one incident 123. Incident records 139 can be related to incidents 123, tickets 126, ticket records 129, solutions 143, and/or potentially other nodes by one or more edges in the graph database 133.

Tickets 126 can be stored as nodes which represent a service ticket submitted to the help desk service 116. Tickets 126 can represent a user-initiated form, report, survey, or other electronic account of the issue and circumstances surrounding the incident 123. In some embodiments, tickets 126 can include a written summary of the symptoms of an issue. According to various examples, tickets 126 can be a vector representation of the service ticket submitted to the help desk service 116. Tickets 126 can be related to incidents 123, incident records 139, ticket records 129, solutions 143, and/or potentially other nodes by one or more edges in the graph database 133.

Ticket records 129 can be stored as nodes which represent a translation of the information within the corresponding ticket 126. In some embodiments, a ticket record 129 can be a vector representation of the content of a ticket 126 obtained using NLP, or other text processing techniques. Ticket records 129 can include the context about the symptoms of an event and the conditions under which an event occurred. In some embodiments, ticket records 129 can be shared by more than one ticket 126. Ticket records 129 can be related to incidents 123, incident records 139, tickets 126, solutions 143, and/or potentially other nodes by one or more edges in a graph database 133.

Solutions 143 can be stored as nodes which represent a set of machine-readable instructions which, when executed on a client device 106, resolve an incident 123. In some embodiments, a solution 143 can be a vector representation of the steps to resolve an incident 123. Solutions 143 can represent a set of executable steps or actions to be taken to resolve the incident 123. In some embodiments, solutions 143 can be a set of instructions provided to an IT professional for resolving the incident 123. In some embodiments, solutions 143 can be shared by one or more incidents 123 and/or tickets 126. Solutions 143 can be connected to incidents 123, incident records 139, tickets 126, ticket records 129, and/or potentially other nodes by one or more edges in a graph database.

The client device 106 is representative of a plurality of client devices 106 that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 159, such as liquid crystal displays (LCDs), gas plasma-based flat panel displays, organic light emitting diode (OLED) displays, electrophoretic ink ("E-ink") displays, projectors, or other types of display devices. In some instances, the display 159 can be a component of the client device 106 or can be connected to the client device 106 through a wired or wireless connection.

The client device 106 can execute various applications such as a client application 163, a telemetry application 166, or other applications. The client application 163 can be executed in a client device 106 to access network content served up by the computing environment 103 or other servers, thereby rendering a user interface 169 on the display 159. To this end, the client application 163 can include a browser, a dedicated application, or other executable, and the user interface 169 can include a network page, an application screen, or other user mechanism for obtaining user input. The client device 106 can be configured to execute applications beyond the client application 163, such as social networking applications, camera applications, word processors, spreadsheets, or other applications. In addition, the client device 106 can be configured to execute a telemetry application 166. The telemetry application 166 can be executed to collect and record telemetry data from the client device 106. As described further in the description of FIG. 3, the telemetry application 166 can send telemetry data to the computing environment 103. The telemetry application 166 can be executed to identify incidents based at least in part on the telemetry data. In some examples, the telemetry application 166 can run continuously on the client device 106 to monitor for and report any unusual data. In some embodiments, the telemetry application 166 can be executed to continuously report telemetry data to the monitoring service 119.

The administrative device 109 is representative of a plurality of administrative devices 109 that can be coupled to the network 113. In some examples, an administrative device 109 can be used by an IT professional to review and resolve incidents 123. The administrative device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The administrative device 109 can include one or more displays 159, such as liquid crystal displays (LCDs), gas plasma-based flat panel displays, organic light emitting diode (OLED) displays, electrophoretic ink ("E-ink") displays, projectors, or other types of display devices. In some instances, the display 159 can be a component of the administrative device 109 or can be connected to the administrative device 109 through a wired or wireless connection.

The administrative device 109 can execute various applications such as an administrative application 156 or other applications. As described in further detail in the description of FIG. 5, the administrative application 156 can be executed to receive the results of a search for solutions 143 and cause a notification 146 to be displayed on the display 159 of the administrative device 109. In some embodiments, the administrative application 156 can be executed to receive a new solution input from the user interface 169 and generate a new solution 143 to be stored in the graph database 133. The administrative device 109 can be configured to execute applications beyond the administrative application 156, such as social networking applications, camera applications, word processors, spreadsheets, or other applications.

Next, a general description of the operation of the various components of the network environment 100 is provided. To begin, a user of one of a plurality of client devices 106 can experience an incident 123 and submit a ticket 126. The help desk service 116 can receive the ticket 126 associated with the incident 123. Additionally, the help desk service 116 can obtain a diagnostic report 136 from the client device 106 and convert both the ticket 126 and the diagnostic report 136 into easily searchable records (e.g., nodes, vectors, etc.). Using similarity detection algorithms, the help desk service 116 can search for similar ticket records 129 and/or incident records 139. In some examples, the help desk service 116 can use the ticket record 129 and/or the incident record 139 as a key to query a graph database 133 for similar ticket records 129 and/or incident records 139.

A monitoring service 119 can use these similar records to identify similar occurrences in one or more other client devices 106. In addition, the help desk service 116 can use the ticket records 129 and/or incident records 139 to query a graph database 133 for one or more solutions 143. By using the edges between nodes, the help desk service 116 can use similar ticket records 129 and/or incident records 139 to locate solutions 143 related to similar occurrences. In some embodiments, these solutions 143 are presented to an IT professional for implementation. In some embodiments, the solutions 143 are automatically pushed to the client device 106 to resolve the issue. If the solution 143 resolves the incident 123, the solution 143 can be stored in the graph database 133 as a node related to the incident 123 by an edge.

In examples where no solution 143 is found in the graph database 133, an IT professional can be alerted that the incident 123 requires troubleshooting, and normal IT ticket-resolution processes can occur. Once an IT professional has resolved an issue, they can submit a new solution 143 to be stored in the graph database 133 as node related to the ticket 126 and corresponding incident 123 by one or more edges.

If the monitoring service 119 identified other client devices 106 which are experiencing similar incidents 123, the solution 143 which was used to resolve the incident 123 on the client device 106 associated with the ticket 126 can be used to resolve the incidents 123 on the other affected client devices 106. Client devices 106 having open tickets 126 regarding the incident 123 can be notified that a solution 143 has been found. Additionally, client devices 106 which have no outstanding tickets 126, but nonetheless have been identified as experiencing similar incidents 123 can be notified of both the incident 123 and the solution 143 which has been found. In some embodiments, the solution 143 can be pushed to any affected client devices 106 that have been identified. Thus, according to various examples, a solution 143 can be connected to each incident 123 and/or ticket 126 stored in the graph database 133.

Figure 2:
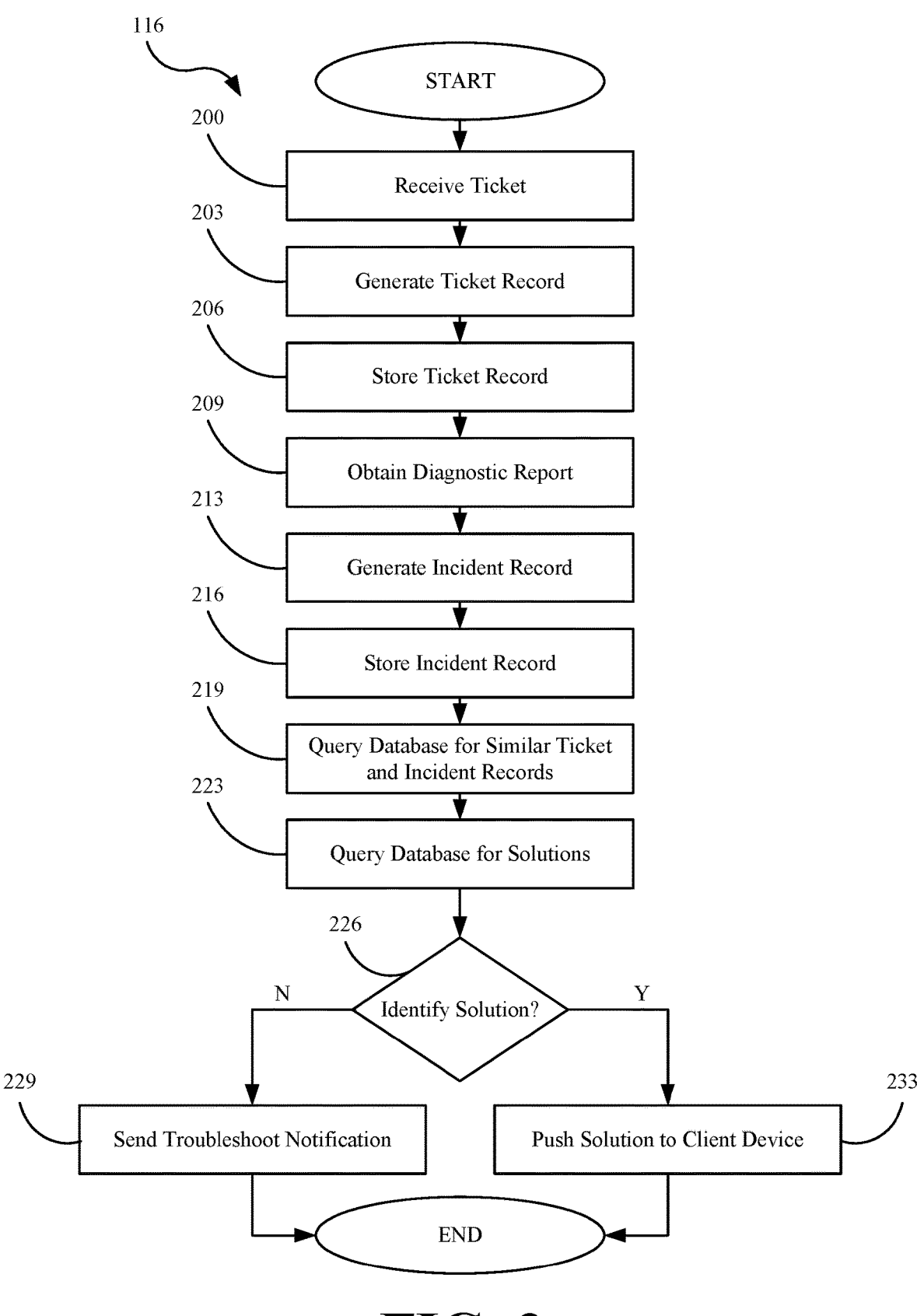
FIG. 2 is a flowchart illustrating one example of functionality implemented as portions of an application executed in a computing environment in the network environment of FIG. 1 according to various embodiments of the present disclosure.

Moving next to FIG. 2, shown is a flowchart that provides one example of the operation of a portion of the help desk service 116 according to various embodiments. It is understood that the flowchart of FIG. 2 provides merely an example of the many types of functional arrangements that can be employed to implement the operation of the portion of the help desk service 116 as described herein. As an alternative, the flowchart of FIG. 2 can be viewed as depicting an example of elements of a method implemented in the computing environment 103 (FIG. 1) according to one or more embodiments.

Beginning with block 200, the help desk service 116 can receive a ticket 126. In some embodiments, the help desk service 116 can receive the ticket 126 from a client application 163 on a client device 106. In some embodiments, the help desk service 116 can obtain the ticket 126 from a data store 153. According to various examples, the help desk service 116 can receive the ticket 126 in response to a user submitting the ticket 126 to an enterprise which hosts the help desk service 116. The ticket 126 can be used by the help desk service to identify an incident 123 on a client device 106 associated with the ticket 126.

At block 203, the help desk service 116 can generate a ticket record 129. The help desk service 116 can generate a ticket record 129 based at least in part on the ticket 126 received at block 200. In some embodiments, the help desk service 116 uses NLP techniques, or other text processing techniques, to extract and analyze text from the ticket 126 to generate the ticket record 129. According to various examples, the help desk service 116 can generate the ticket record 129 as a vector representation of the contents of the ticket 126.

At block 206, the help desk service 116 can store the ticket record 129. In some embodiments, the help desk service 116 can store the ticket record 129 in a data store 153 in the computing environment 103. In some embodiments, the help desk service 116 can store the ticket record 129 as a node in a graph database 133. According to various examples, the help desk service 116 stores the ticket record 129 as a node in the graph database and adds one or more edges connecting the ticket record 129 to at least one ticket 126, incident 123, incident record 139, and/or solution 143.

Next, at block 209, the help desk service 116 can obtain a diagnostic report 136. In some embodiments, the help desk service 116 receives the diagnostic report 136 from a telemetry application 166 on the client device 106, from a monitoring service 119, or from another application in the network environment 100. In some examples, the help desk service 116 can obtain the diagnostic report 136 from a data store 153.

Block 213 shows that the help desk service 116 can generate an incident record 139. The help desk service 116 can generate the incident record 139 using various analysis techniques to covert the data from the diagnostic report 136 into an incident record 139. The incident record 139 can be generated based at least in part on the telemetry data included in the diagnostic report 136. According to various examples, the help desk service 116 can generate the incident record 139 as a vector representation of the reported incident 123.

At block 216, the help desk service 116 can store the incident record 139. In some embodiments, the help desk service 116 can store the incident record 139 as a node in a graph database and add one or more edges connecting the incident record 139 to at least one incident 123, ticket 126, ticket record 129, and/or solution 143. In some embodiments, the help desk service 116 can store the incident record 139 in a data store 153 in the computing environment 103.

Moving to block 219, the help desk service 116 can query the graph database 133 for similar ticket records 129 and/or similar incident records 139. In some embodiments, the ticket record 129 generated at block 203 can be used as a key to query the graph database 133 for similar ticket records 129. In some embodiments, the incident record 139 generated at block 213 can be used as a key to query the graph database for similar incident records 139. According to various examples, similar ticket records 129 and/or incident records 139 can be identified by searching for similar vectors. In some embodiments, the help desk service 116 uses one or more similarity detection algorithms to identify similar ticket records 129 and/or incident records 139. The help desk service 116 can rank, or score, the ticket records 129 and/or incident records 139 based on their similarity.

At block 223, the help desk service 116 can query the graph database 133 for solutions 143. In some embodiments, the help desk service 116 can use similar ticket records 129 and/or incident records 139 to query the graph database 133 for one or more solutions 143. By following the edges between nodes in the graph database 133, the help desk service 116 can determine one or more solutions 143 related to the similar ticket records 129 and/or similar incident records 139. According to various examples, the help desk service 116 can use the top-ranking similar ticket records 129 and/or incident records 139 to query the graph database 133 for a top-ranked solution 143. In some embodiments, the help desk service 116 can identify a backup solution 143 by using a next-most similar ticket record 129 and/or incident record 139 as a key while querying the graph database 133.

Block 226 shows that, based at least in part on whether a solution 143 has been identified or not, the help desk service 116 can proceed to either block 229 or block 233. If a solution 143 has been identified, the help desk service 116 can proceed to block 233. If no solution 143 has been identified, the help desk service 116 can proceed to block 229.

At block 229, the help desk service 116 can send a troubleshoot notification 146. In some embodiments, the help desk service 116 can send a troubleshoot notification 146 if a solution 143 has not been identified during the query described in block 223. According to various examples, the help desk service 116 can send the troubleshoot notification 146 to the client application 163 to cause the troubleshoot notification 146 to be displayed on the display 159 of the client device 106. According to various examples, the help desk service 116 can send the troubleshoot notification 146 to the administrative application 156 to cause the trouble-shoot notification 146 to be displayed on the display 159 of the administrative device 109. In some embodiments, the help desk service 116 sends the troubleshoot notification 146 to an IT professional. In some embodiments, after block 229, the flowchart of FIG. 2 ends.

At block 233, the help desk service 116 can push a solution 143 to the client device 106. In some embodiments, the help desk service 116 can push the solution 143 to the client device 106 if the solution 143 was identified in response to the query described in block 223. According to various examples, the help desk service 116 can send a notification 146 to an administrative application 156 on an administrative device 109 or to a client application 163 on a client device 106 to alert a user that the solution 143 has been found and/or will be implemented. In some embodiments, after block 233, the flowchart of FIG. 2 ends.

Referring next to FIG. 3, shown is a flowchart that provides one example of the operation of a portion of the telemetry application 166 according to various embodiments. It is understood that the flowchart of FIG. 3 provides merely an example of the many different types of functional arrangements that can be employed to implement the operation of the portion of the telemetry application 166 as described herein. As an alternative, the flowchart of FIG. 3 can be viewed as depicting an example of elements of a method implemented in the computing environment 103 (FIG. 1) according to one or more embodiments.

Beginning with block 300, the telemetry application 166 can collect telemetry data on a client device 106. In some embodiments, the telemetry application 166 can continuously collect telemetry data from the client device 106. According to some examples, the telemetry application 166 can collect the telemetry data in the form of a snapshot when unusual activity is detected.

Next, at block 303, the telemetry application 166 can identify incidents 123. In some embodiments, the telemetry application 166 can analyze the telemetry data collected at block 300 to identify unusual activity or other indicators of an incident 123. According to some embodiments, the telemetry application 166 can identify incidents 123 in response to an instruction to do so from another application, service, or device in the network environment 100. In some embodiments, the telemetry application 166 automatically identifies incidents 123.

At block 306, the telemetry application 166 can generate a diagnostic report 136. In some embodiments, the telemetry application 166 generates a diagnostic report 136 for each incident 123 that is identified at block 303. However, in some embodiments, the telemetry application 166 generates a diagnostic report 136 regardless of whether an incident 123 has been identified. In some embodiments, the telemetry application 166 generates a diagnostic report 136 in response to an instruction to do so from another application, service, or device in the network environment 100. According to various examples, the telemetry application 166 generates the diagnostic report 136 based at least in part on the telemetry data collected at block 300.

In block 309, the telemetry application 166 sends the diagnostic report 136. According to various embodiments, the telemetry application 166 can send the diagnostic report 136 generated at block 306 to the help desk service 116, the monitoring service 119, the administrative application 156, or another service or application in the network environment 100. In some embodiments, the telemetry application 166 sends the diagnostic report 136 to a data store 153. After block 309, the flowchart of FIG. 3 ends.

Referring next to FIG. 4, shown is a flowchart that provides one example of the operation of a portion of the monitoring service 119 according to various embodiments.

It is understood that the flowchart of FIG. 4 provides merely an example of the many different types of functional arrangements that can be employed to implement the operation of the portion of the monitoring service 119 as described herein. As an alternative, the flowchart of FIG. 4 can be viewed as depicting an example of elements of a method implemented in the computing environment 103 (FIG. 1) according to one or more embodiments.

Beginning with block 400, the monitoring service 119 can receive diagnostic reports 136. In some embodiments, the monitoring service 119 receives the diagnostic reports 136 from telemetry applications 166 on a plurality of client devices 106. According to some embodiments, the monitoring service 119 can obtain a diagnostic report 136 for each client device 106 in the network environment 100. In some examples, the monitoring service 119 can obtain the diagnostic reports 136 from a data store 153. The monitoring service 119 can receive the diagnostic reports 136 in response to a request from the monitoring service 119 to another service or application.

At block 402, the monitoring service 119 can generate an incident record 139. The monitoring service 119 can generate the incident record 139 using various analysis techniques to covert the data from the diagnostic report 136 received at block 400 into an incident record 139. The incident record 139 can be generated based at least in part on the telemetry data included in the diagnostic report 136. According to various examples, the monitoring service 119 can generate the incident record 139 as a vector representation of the reported incident 123.

At block 403, the monitoring service 119 can identify similar incidents 123. The monitoring service 119 can identify similar incidents 123 based at least in part on analyzing the diagnostic reports 136 received at block 400. In some embodiments, the monitoring service 119 can execute one or more similarity detection algorithms which compare individual diagnostic reports 136 to a diagnostic report 136 associated with a particular ticket 126. According to various examples, the similarity detection algorithm can be configured to identify one or more similar diagnostic reports 136 based at least in part on the comparison to the diagnostic report 136 associated with the particular ticket 126. In some embodiments, the monitoring service 119 can identify similar incidents 123 from the historical data of one client device 106 and/or from a plurality of different client devices 106.

Next, at block 406, the monitoring service 119 can generate a list of affected devices 149. In some embodiments, the monitoring service 119 generates a list of affected devices 149 based at least on the similar incidents 123 identified at block 403. According to various examples, the list of affected devices 149 generated by the monitoring service 119 identifies each client device 106 in the network environment 100 which is experiencing or has experienced the same or a similar incident 123 as a client device 106 associated with a new ticket 126. In some embodiments, the monitoring service 119 can generate a list of affected devices 149 which includes client devices 106 which have outstanding tickets 126 corresponding to the identified incident 123 from block 403. In some embodiments, the monitoring service 119 generates a list of affected devices 149 which includes client devices 106 which are experiencing similar incidents 123, as identified at block 403, but have no outstanding tickets 126. According to some examples, the monitoring service 119 generates a list of affected devices 149 which includes client devices 106 which have experienced similar incidents 123, as identified at block 403, and have resolved tickets 126.

At block 409, the monitoring service 119 can send the list of affected devices 149. According to various embodiments, the monitoring service 119 can send the list of affected devices 149 to the help desk service 116, the administrative application 156, or another service or application in the network environment 100. In some examples, the monitoring service 119 can send the list of affected devices 149 to a data store 153. The monitoring service 119 can send the list of affected devices 149 in response to a request from another service, application, or device in the network environment 100. After block 409, the flowchart of FIG. 4 ends.

Figure 5:
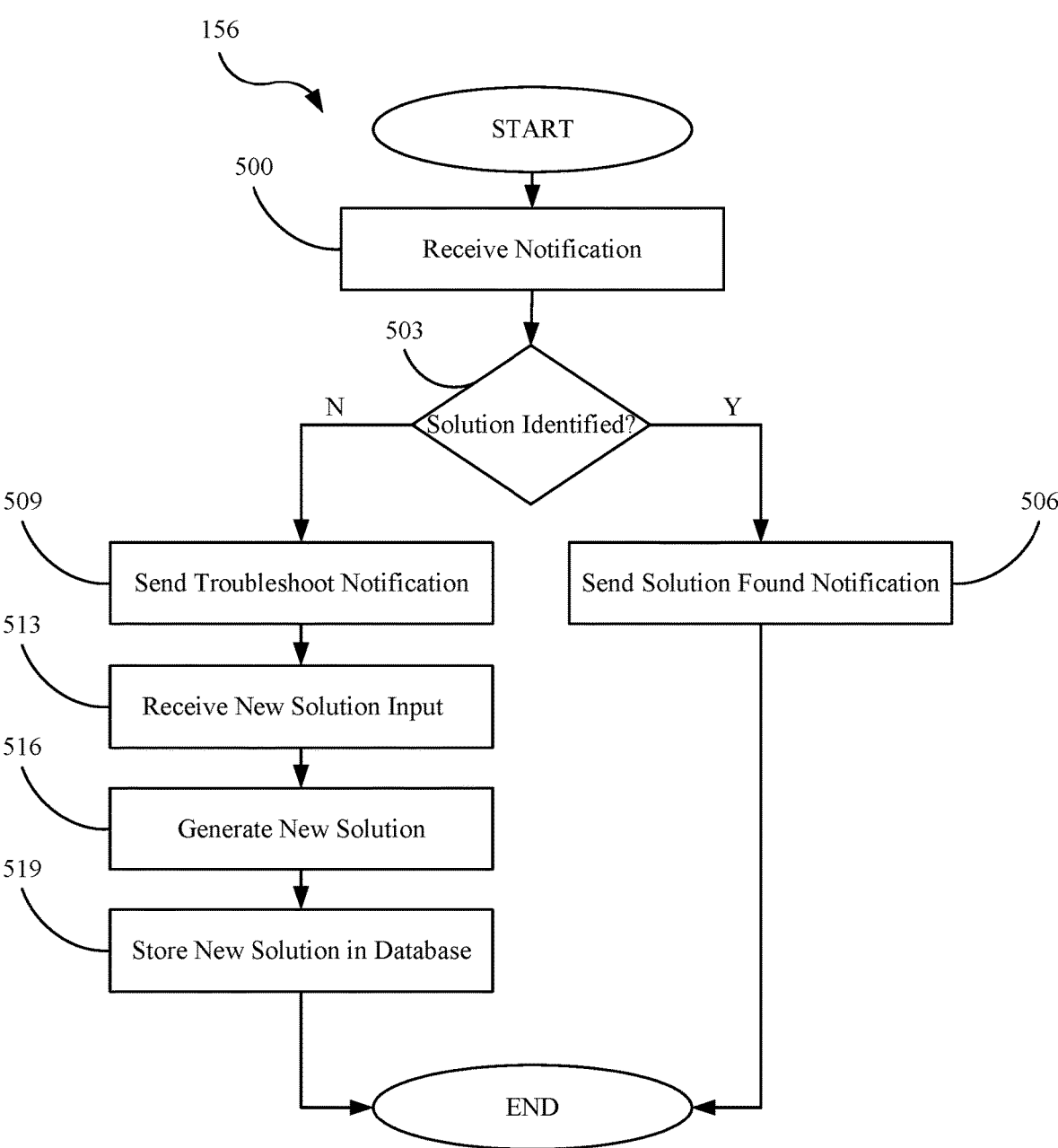
FIG. 5 is a flowchart illustrating one example of functionality implemented as portions of an application executed in a computing environment in the network environment of FIG. 1 according to various embodiments of the present disclosure.

Moving on to FIG. 5, shown is a flowchart that provides one example of the operation of a portion of the administrative application 156 according to various embodiments. It is understood that the flowchart of FIG. 5 provides merely an example of the many different types of functional arrangements that can be employed to implement the operation of the portion of the administrative application 156 as described herein. As an alternative, the flowchart of FIG. 5 can be viewed as depicting an example of elements of a method implemented in the computing environment 103 (FIG. 1) according to one or more embodiments.

Beginning with block 500, the administrative application 156 can receive a notification 146. The administrative application 156 can receive a notification 146 from the help desk service 116, the telemetry application 166, the monitoring service 119, or another service, application, or device in the network environment 100. In some embodiments, the administrative application 156 can obtain the notification 146 from a data store 153 in response to an instruction to do so from another service, application, or device in the network environment 100. In some embodiments, the notification 146 received by the administrative application 156 indicates whether or not a solution 143 has been identified.

Block 503 shows that, based at least in part on whether the notification 146 indicates that a solution 143 has been identified or not, the administrative application 156 can proceed to block 506 or block 509. If the notification 146 received at block 500 indicates that a solution 143 has been identified, then the administrative application 156 moves to block 506. If the notification 146 received at block 500 indicates that no solution 143 was identified, then the administrative application 156 can proceed to block 509.

At block 506, the administrative application 156 can send a "Solution Found" notification 146. In some embodiments, the administrative application 156 can send the "Solution Found" notification 146 to the display 159 of the administrative device 109, the client device 106, or another destination. In some embodiments, the administrative application 156 can send the "Solution Found" notification to an IT professional. In some embodiments, after block 506, the flowchart of FIG. 5 ends.

At block 509, the administrative application 156 can send a "Troubleshoot" notification 146. In some embodiments, the administrative application 156 can send the "Troubleshoot" notification 146 to the display 159 of the administrative device 109, the client device 106, or another destination. In some embodiments, the administrative application 156 can send the "Troubleshoot" notification 146 to an IT professional.

At block 513, the administrative application 156 can receive a new solution input. In some embodiments, the administrative application 156 can receive the new solution input from a user interface 169. According to various examples, the administrative application 156 can receive the new solution input in response to sending the "Troubleshoot" notification 146. In some embodiments, the new solution input includes a set of steps or instructions for resolving an incident 123. In some embodiments, the new solution input is received by the administrative application 156 from a client device 106.

Next, at block 516, the administrative application 156 can generate a new solution 143. The administrative application 156 can generate the new solution 143 based at least in part on the new solution input received at block 513. In some embodiments, the administrative application 156 generates the new solution 143 by converting the new solution input to a set of machine-readable instructions which, when executed on a client device 106, resolve an incident 123. In some embodiments, the administrative application 156 generates the new solution 143 in response to receiving the new solution input at block 513.

At block 519, the administrative application 156 can store the new solution 143 in a database. In some embodiments, the administrative application 156 can store the new solution 143 as a node in the graph database 133 and add one or more edges connecting the new solution 143 to at least one incident 123, incident record 139, ticket 126, and/or ticket record 129. In some embodiments, the administrative application 156 can store the new solution 143 in a data store 153 in the computing environment 103. In some embodiments, after block 519, the flowchart of FIG. 5 ends.

Figure 6:
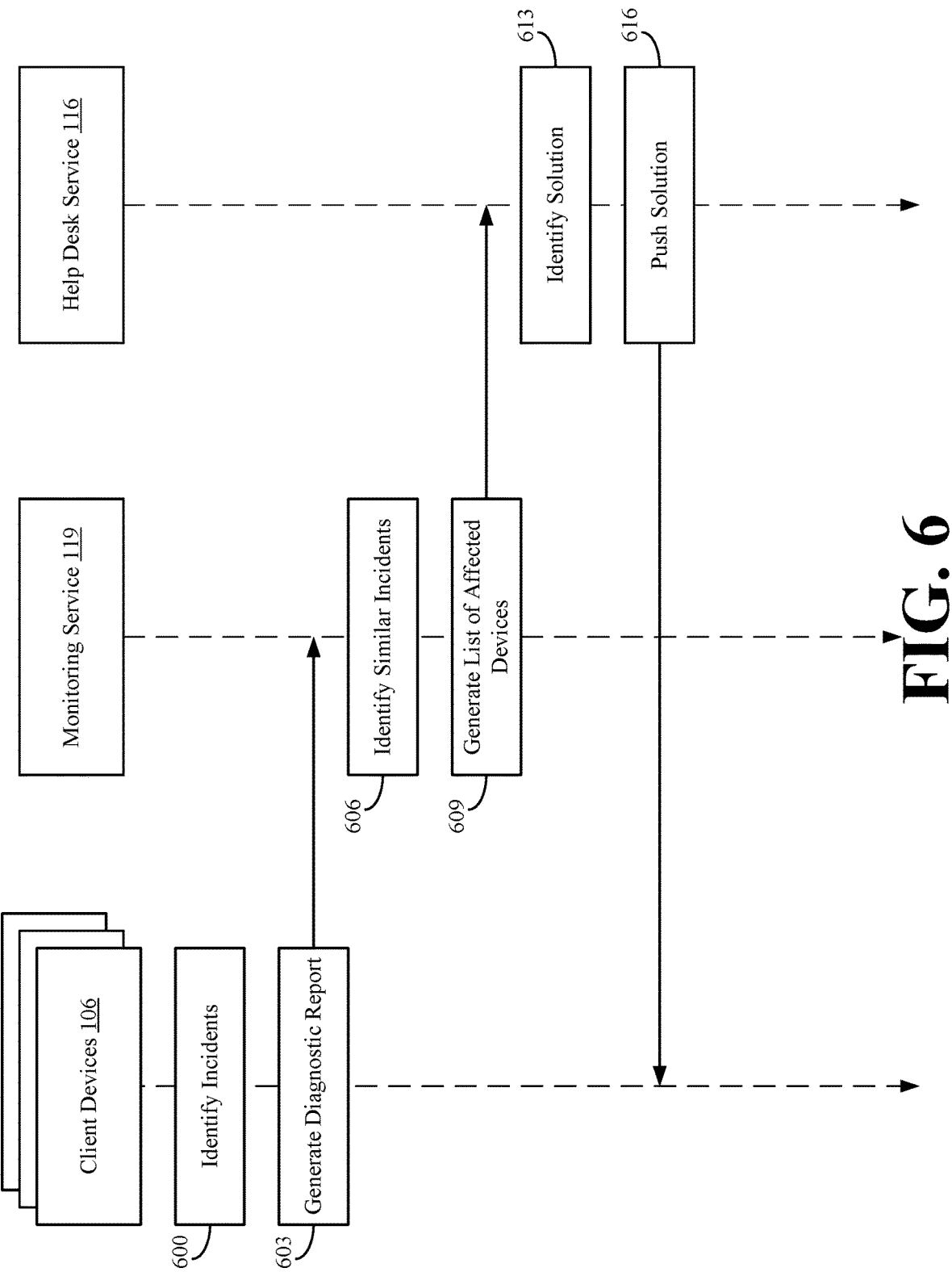
FIG. 6 is a sequence diagram illustrating one example of the interactions between the components of the network environment of FIG. 1 according to various embodiments of the present disclosure.

Turning now to FIG. 6, shown is a sequence diagram illustrating one example of the interactions between multiple client devices 106, the monitoring service 119, and the help desk service 116 according to various embodiments. It is understood that the sequence diagram of FIG. 6 provides merely an example of the many different types of functional arrangements that can be employed to implement the operation of the interactions between the client devices 106, the monitoring service 119, and the help desk service 116. As an alternative, the sequence diagram of FIG. 6 can be viewed as depicting an example of elements of a method implemented within the network environment 100 (FIG. 1) according to one or more embodiments.

Beginning with block 600, the client devices 106 can identify incidents 123. In some embodiments, the telemetry application 166 of a client device 106 can identify incidents 123 as described in the description of block 303 of FIG. 3. In some embodiments, a user of a client device 106 can identify an incident 123 in a ticket 126 submitted via the client device 106. According to various examples, the client devices 106 can continuously send raw telemetry data to the monitoring service 119 for incident identification and diagnostic report 136 generation.

At block 603, the client devices 106 can generate diagnostic reports 136. According to various embodiments, the telemetry application 166 of a client device 106 can generate a diagnostic report 136 as described in the description of block 306 of FIG. 3. In some embodiments, the diagnostic report 136 generated by each client device 106 corresponds to an incident 123 identified at block 600. In some embodiments, a diagnostic report 136 is generated for each client device 106 regardless of whether an incident 123 was identified on that client device 106. The diagnostic reports 136 can be sent to the monitoring service 119 for analysis.

Next, at block 606, the monitoring service 119 can identify similar incidents 123. According to various embodiments, the monitoring service 119 can identify incidents 123 similar to those identified at block 600. In some examples, the monitoring service 119 can identify similar incidents 123 as described in the description of block 403 of FIG. 4. In some embodiments, the similar incidents 123 identified by the monitoring service 119 can be sent to or otherwise shared with the help desk service 116.

At block 609, the monitoring service 119 generate a list of affected devices 149. According to various examples, the monitoring service can generate the list of affected devices 149 as described in the description of block 406 of FIG. 4. In some embodiments, the monitoring service 119 can send the list of affected devices 149 to the help desk service 116.

At block 613, the help desk service 116 can identify a solution 143. The help desk service 116 can identify the solution 143 in graph database 133 by querying the graph database 133 based at least in part on the similar incidents 123 identified at block 606. In some embodiments, the help desk service 116 can identify tickets 126 and/or ticket records 129 associated with the incidents 123 and use the tickets 126 and/or ticket records 129 as keys to query the graph database 133.

At block 616, the help desk service 116 can push the solution 143 to a plurality of client devices 106. In some embodiments, the help desk service 116 can push the solution 143 identified at block 613 to the client devices 106 identified on the list of affected devices 149. The solution 143 can be pushed to the client devices 106 in parallel or in sequence. In some embodiments, the solution 143 is only pushed to client devices 106 on the list of affected devices 149. In some embodiments, the solution 143 can be pushed to all client devices 106 in the network environment 100 regardless of whether the client devices 106 were identified on the list of affected devices 149. After block 616, the sequence diagram of FIG. 6 ends.

Figure 7:
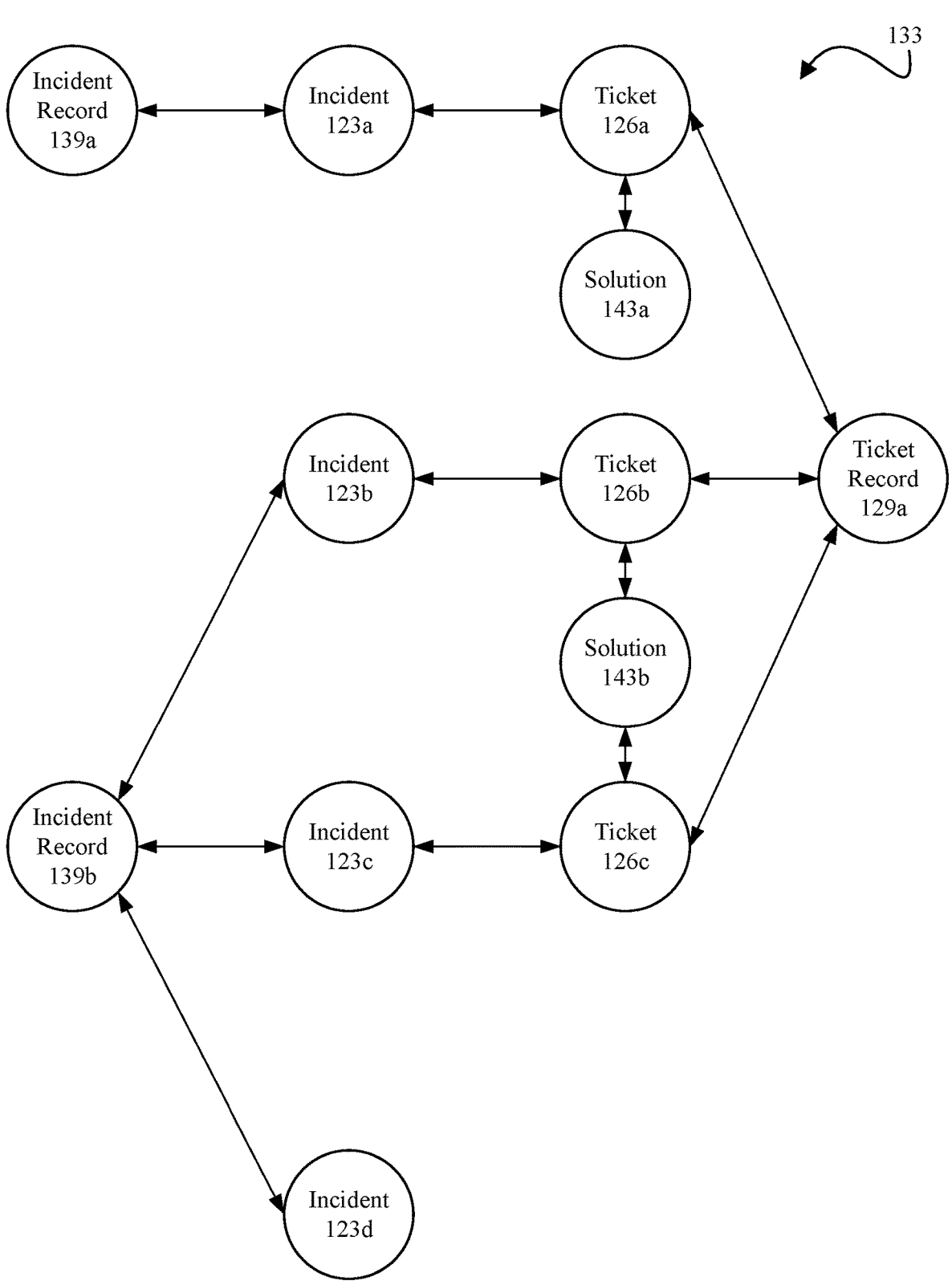
FIG. 7 is a diagram illustrating one example of a graph database in a computing environment in the network environment of FIG. 1 according to various embodiments of the present disclosure.

Moving to FIG. 7, shown is one example of the storage of incidents 123, incident records 139, tickets 126, ticket records 129, and solutions 143 in an example graph database 133. It is understood that the diagram of FIG. 7 provides merely an example of the many different types of arrangements and data that can be employed in the graph database 133.

According to the example of FIG. 7, incident record 139*a* is related to incident 123*a* which is related to ticket 126*a* which is also related to ticket record 129*a*. Ticket record 129*a* is shared by ticket 126*a*, 126*b*, and 126*c*. This demonstrates the ability of a single ticket record 129 to correspond to multiple tickets 126. This can occur when multiple tickets 126 are raised across client devices 106, where the tickets 126 all describe similar symptoms of an incident 123. Similarly, while incident 123*b*, incident 123*c*, and incident 123*d* are all distinct nodes in the graph database 133, they all relate to a single incident record 139*b*. This can occur because each incident 123 can occur on a separate client device 106 at a separate time, but all of the incidents 123 can have similar diagnostic report 136 and therefore share the same incident record 139*b*. Similarly, solutions 143 can be shared by tickets 126. As shown in FIG. 7, where ticket 126*b* and ticket 126*c* share solution 143*b*, when tickets 126 are resolved by the same set of steps or actions, the solution 143 will be the same in the graph database 133. Thus, the same set of steps or actions was used to resolve both ticket 126*b* and ticket 126*c*. By tracing edges, or relationships between nodes, the graph database 133 can be utilized to identify solutions 143 to similar incidents 123.

The flowcharts and sequence diagram of FIGS. 2-6 show examples of the functionality and operation of an implementation of portions of the help desk service 116, the monitoring service 119, the telemetry application 166, and the administrative application 156. If embodied in software, each block may represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor in a computer system or other system. The machine code can be converted from the source code, etc. If embodied in hardware, each block may represent a circuit or a number of interconnected circuits to implement the specified logical function(s).

Although the flowcharts and sequence diagram of FIGS. 2-6 show a specific order of execution, it is understood that the order of execution may differ from that which is depicted. For example, the order of execution of two or more blocks can be scrambled relative to the order shown. Also, two or more successive blocks shown in FIGS. 2-6 can be executed concurrently or with partial concurrence. Further, in some embodiments, one or more of the blocks shown in FIGS. 2-6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the help desk service 116, the monitoring service 119, the telemetry application 166, and the administrative application 156, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM), dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the help desk service 116, the monitoring service 119, the telemetry application 166, and the administrative application 156, can be implemented and structured in a variety of ways. For example, one or more applications described can be implemented as modules or components of a single application. Further, one or more applications described herein can be executed in shared or separate computing devices or a combination thereof. For example, a plurality of the applications described herein may execute in the same computing device and/or client device 106, or in multiple computing devices in the same computing environment 103. Additionally, it is understood that terms such as "application," "service," "system," "engine," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
  a computing device comprising a processor and a memory; and
  a first set of machine-readable instructions stored in the memory that, when executed by the processor, cause the computing device to at least:
    receive a ticket associated with an incident on a first client device of a plurality of client devices;
    generate a ticket record by extracting information from the ticket using natural language processing techniques and generating a vector representation of the extracted information, wherein the ticket record stores the vector representation;
    using the vector representation of the ticket record, query a graph database for one or more similar ticket records, the graph database comprising a plurality of typed nodes including ticket nodes, incident nodes, and solution nodes, wherein the ticket record is stored as a ticket node associated with the vector representation in the graph database; and
    in response to obtaining the one or more similar ticket records from the graph database based on vector similarity of the ticket nodes storing the one or more similar ticket records to the ticket node storing the ticket record, query the graph database for one or more solution nodes storing one or more solution records related to the ticket nodes storing the one or more similar ticket records by one or more edges in the graph database, wherein the one or more solution records comprise a second set of machine-readable instructions which, when executed on the first client device, resolve the incident.

2. The system of claim 1, wherein the first set of machine-readable instructions, when executed, further cause the computing device to at least push the second set of machine-readable instructions to the first client device to be executed.

3. The system of claim 1, wherein the first set of machine-readable instructions, when executed, further cause the computing device to at least send, in response to obtaining the one or more solution records, a notification to an administrative computing device, wherein the notification indicates that a solution has been identified.

4. The system of claim 1, wherein the first set of machine-readable instructions, when executed, further cause the computing device to at least send, in response to a failure to obtain the one or more solution records, a troubleshoot notification to an administrative computing device.

5. The system of claim 1, wherein the first set of machine-readable instructions, when executed, further cause the computing device to at least:

obtain, from the first client device, a diagnostic report corresponding in time to the incident;

generate an incident record comprising the diagnostic report;

store the incident record in the graph database as an incident node of the incident nodes; and add an edge connecting the incident node to the ticket node.

6. The system of claim 5, wherein the first set of machine-readable instructions, when executed, further cause the computing device to at least:

query the graph database for one or more similar incident nodes containing one or more similar incident records; and in response to obtaining the one or more similar incident nodes containing the one or more similar incident records from the graph database, query the graph database for one or more solution nodes containing one or more solution records related to the similar incident nodes by one or more edges in the graph database.

7. The system of claim 5, wherein the first set of machine-readable instructions, when executed, further cause the computing device to at least:

obtain a plurality of diagnostic reports from the plurality of client devices;

execute a similarity detection algorithm which compares individual diagnostic reports of the plurality of diagnostic reports to the diagnostic report from the first client device, the similarity detection algorithm configured to identify one or more similar diagnostic reports;

identify one or more affected client devices from the plurality of client devices, the one or more affected client devices corresponding to the one or more similar diagnostic reports; and push the second set of machine-readable instructions to the one or more affected client devices.

8. A method, comprising:

receiving, by a computing device, a ticket associated with an incident on a first client device of a plurality of client devices;

generating, by the computing device, a ticket record by extracting information from the ticket using natural language processing techniques and generating a vector representation of the extracted information, wherein the ticket record stores the vector representation;

using the vector representation of the ticket record, querying, by the computing device, a graph database for one or more similar ticket records, the graph database comprising a plurality of typed nodes including ticket nodes, incident nodes, and solution nodes, wherein the ticket record is stored as a ticket node associated with the vector representation in the graph database; and in response to obtaining the one or more similar ticket records from the graph database based on vector similarity of the ticket nodes storing the one or more similar ticket records to the ticket node storing the ticket record, querying, by the computing device, the graph database for one or more solution nodes storing one or more solution records related to the ticket nodes storing the one or more similar ticket records by one or more edges in the graph database, wherein the one or more solution records comprise a set of machine-readable instructions which, when executed on the first client device, resolve the incident.

9. The method of claim 8, further comprising pushing the set of machine-readable instructions to the first client device to be executed.

10. The method of claim 8, further comprising sending, in response to obtaining the one or more solution records, a notification to an administrative computing device, wherein the notification indicates that a solution has been identified.

11. The method of claim 8, further comprising sending, in response to a failure to obtain the one or more solution records, a troubleshoot notification to an administrative computing device.

12. The method of claim 8, further comprising:

obtaining, from the first client device, a diagnostic report corresponding in time to the incident;

generating an incident record comprising the diagnostic report;

storing the incident record in the graph database as an incident node of the incident nodes; and adding an edge connecting the incident node to the ticket node.

13. The method of claim 12, further comprising:

querying the graph database for one or more similar incident nodes containing one or more similar incident records; and in response to obtaining the one or more similar incident nodes containing the one or more similar incident records from the graph database, querying the graph database for one or more solution nodes containing one or more solution records related to the similar incident nodes by one or more edges in the graph database.

14. The method of claim 12, further comprising:

obtaining a plurality of diagnostic reports from the plurality of client devices;

executing a similarity detection algorithm which compares individual diagnostic reports of the plurality of diagnostic reports to the diagnostic report from the first client device, the similarity detection algorithm configured to identify one or more similar diagnostic reports;

identifying one or more affected client devices from the plurality of client devices, the one or more affected client devices corresponding to the one or more similar diagnostic reports; and pushing the set of machine-readable instructions to the one or more affected client devices.

15. A non-transitory, computer-readable medium, comprising a first set of machine readable instructions that, when executed by a processor of a computing device, cause the computing device to at least:

receive a ticket associated with an incident on a first client device of a plurality of client devices;

generate a ticket record by extracting information from the ticket using natural language processing techniques and generating a vector representation of the extracted information, wherein the ticket record stores the vector representation;

using the vector representation of the ticket record, query a graph database for one or more similar ticket records, the graph database comprising a plurality of typed nodes including ticket nodes, incident nodes, and solution nodes, wherein the ticket record is stored as a ticket node associated with the vector representation in the graph database; and in response to obtaining the one or more similar ticket records from the graph database based on vector similarity of the ticket nodes storing the one or more similar ticket records to the ticket node storing the ticket record, query the graph database for one or more solution nodes storing one or more solution records related to the ticket nodes storing the one or more similar ticket records by one or more edges in the graph database, wherein the one or more solution records comprise a second set of machine-readable instructions which, when executed on the first client device, resolve the incident.

16. The non-transitory, computer-readable medium of claim 15, wherein the machine-readable instructions further cause the computing device to at least push the second set of machine-readable instructions to the first client device to be executed.

17. The non-transitory, computer-readable medium of claim 15, wherein the machine-readable instructions further cause the computing device to at least send, in response to obtaining the one or more solution records, a notification to an administrative computing device, wherein the notification indicates that a solution has been identified.

18. The non-transitory, computer-readable medium of claim 15, wherein the machine-readable instructions, when executed, further cause the computing device to at least:

obtain, from the first client device, a diagnostic report corresponding in time to the incident;

generate an incident record comprising the diagnostic report;

store the incident record in the graph database as an incident node of the incident nodes; and add an edge connecting the incident node to the ticket node.

19. The non-transitory, computer-readable medium of claim 18, wherein the machine-readable instructions further cause the computing device to at least:

query the graph database for one or more similar incident nodes containing one or more similar incident records; and in response to obtaining the one or more similar incident nodes containing the one or more similar incident records from the graph database, query the graph database for one or more solution nodes containing one or more solution records related to the similar incident nodes by one or more edges in the graph database.

20. The non-transitory, computer-readable medium of claim 18, wherein the machine-readable instructions further cause the computing device to at least:

obtain a plurality of diagnostic reports from the plurality of client devices;

execute a similarity detection algorithm which compares individual diagnostic reports of the plurality of diagnostic reports to the diagnostic report from the first client device, the similarity detection algorithm configured to identify one or more similar diagnostic reports;

identify one or more affected client devices from the plurality of client devices, the one or more affected client devices corresponding to the one or more similar diagnostic reports; and push the second set of machine-readable instructions to the one or more affected client devices.

* * * * *